(12) United States Patent
Zwicklhuber et al.

(10) Patent No.: US 11,426,899 B2
(45) Date of Patent: Aug. 30, 2022

(54) METHOD FOR ARRANGING SEMI-FINISHED PRODUCTS

(71) Applicant: ENGEL AUSTRIA GmbH, Schwertberg (AT)

(72) Inventors: Paul Zwicklhuber, Kremsmuenster (AT); Alexander Neiberger, Naarn im Machland (AT)

(73) Assignee: ENGEL AUSTRIA GMBH, Schwertberg (AT)

(*) Notice: Subject to any disclaimer, the term of this patent is extended or adjusted under 35 U.S.C. 154(b) by 229 days.

(21) Appl. No.: 16/850,646

(22) Filed: Apr. 16, 2020

(65) Prior Publication Data

US 2020/0238575 A1     Jul. 30, 2020

Related U.S. Application Data

(63) Continuation of application No. PCT/AT2018/060269, filed on Nov. 13, 2018.

(30) Foreign Application Priority Data

Nov. 14, 2017    (AT) ............................... A50954/2017

(51) Int. Cl.
     *B29C 31/00*          (2006.01)
     *B25J 9/16*            (2006.01)
     (Continued)

(52) U.S. Cl.
     CPC ........... *B29C 31/008* (2013.01); *B25J 9/1687* (2013.01); *B25J 9/1697* (2013.01); *B29C 31/08* (2013.01);
     (Continued)

(58) Field of Classification Search
     CPC ..... B29C 70/386; B29C 70/38; B29C 31/008; B29C 31/08; B29C 45/14008;
     (Continued)

(56) References Cited

U.S. PATENT DOCUMENTS 8,048,253 B2    11/2011    Cramer et al.
8,168,029 B2    5/2012    Cramer et al.
(Continued)

FOREIGN PATENT DOCUMENTS

AT           514721        6/2015
AT           518548       11/2017
(Continued)

OTHER PUBLICATIONS

Translation of AT 514721 ("Zwicklhuber") (Year: 2015).*
International Search Report dated Jan. 24, 2019 in International (PCT) Application No. PCT/AT2018/060269.

*Primary Examiner* — Niki Bakhtiari
*Assistant Examiner* — John J DeRusso
(74) *Attorney, Agent, or Firm* — Wenderoth, Lind & Ponack, L.L.P.

(57) ABSTRACT

A method of arranging, in particular thermoplastic, semi-finished products by using an electronically controlled or regulated placing device for the semi-finished products. The method includes detecting at least one part of an outline of a semi-finished product to be placed, wherein the detecting is carried out by a detection device, determining a target position for the semi-finished product and/or for the placing device for placing the semi-finished product by matching the at least one part of the outline with a placing edge occurring on an underlying surface, and placing the semi-finished product by the placing device using the target position.

24 Claims, 6 Drawing Sheets

(51) Int. Cl.
   *B29C 45/14* (2006.01)
   *B29C 45/76* (2006.01)
   *B29C 65/78* (2006.01)
   *B29C 70/38* (2006.01)
   *B29C 31/08* (2006.01)

(52) U.S. Cl.
   CPC ........ *B29C 45/14786* (2013.01); *B29C 45/76* (2013.01); *B29C 65/782* (2013.01); *B29C 70/38* (2013.01); B29C 45/14 (2013.01); B29C 65/7841 (2013.01); B29C 2945/761 (2013.01); B29C 2945/76294 (2013.01); B29C 2945/76357 (2013.01); B29C 2945/76464 (2013.01); B29C 2945/76933 (2013.01); B29C 2945/76943 (2013.01); G05B 2219/40058 (2013.01)

(58) Field of Classification Search
   CPC ...... B29C 65/7841; B29C 2945/76943; B29C 2945/76464; B29C 2945/76294; B29C 2945/76357; B29C 65/782; B29C 2945/761; B25J 9/1697; G05B 2219/40058
   See application file for complete search history.

(56) References Cited

U.S. PATENT DOCUMENTS

| | | | |
|---|---|---|---|
| 8,414,729 | B2 | 4/2013 | Cramer et al. |
| 8,992,715 | B2 | 3/2015 | Cramer et al. |
| 9,162,434 | B2 | 10/2015 | Cramer et al. |
| 9,694,546 | B2 | 7/2017 | Kisch |
| 9,969,131 | B2 | 5/2018 | Samak Sangari et al. |
| 10,076,883 | B2 | 9/2018 | Prebil et al. |
| 2006/0219609 | A1* | 10/2006 | Canepa .......... G01M 3/34 209/552 |
| 2009/0101277 | A1 | 4/2009 | Cramer et al. |
| 2009/0199948 | A1 | 8/2009 | Kisch |
| 2012/0018097 | A1 | 1/2012 | Cramer et al. |
| 2012/0186749 | A1 | 7/2012 | Cramer et al. |
| 2012/0330453 | A1 | 12/2012 | Samak Sangari et al. |
| 2013/0186557 | A1 | 7/2013 | Cramer et al. |
| 2013/0276954 | A1 | 10/2013 | Cramer et al. |
| 2016/0325509 | A1 | 11/2016 | Prebil et al. |

FOREIGN PATENT DOCUMENTS

| | | |
|---|---|---|
| DE | 10 2015 000 618 | 8/2015 |
| DE | 10 2015 201 551 | 8/2016 |
| DE | 10 2016 011 903 | 4/2017 |
| EP | 3 093 130 | 11/2016 |
| WO | 2009/042225 | 4/2009 |
| WO | 2013/016487 | 1/2013 |

\* cited by examiner

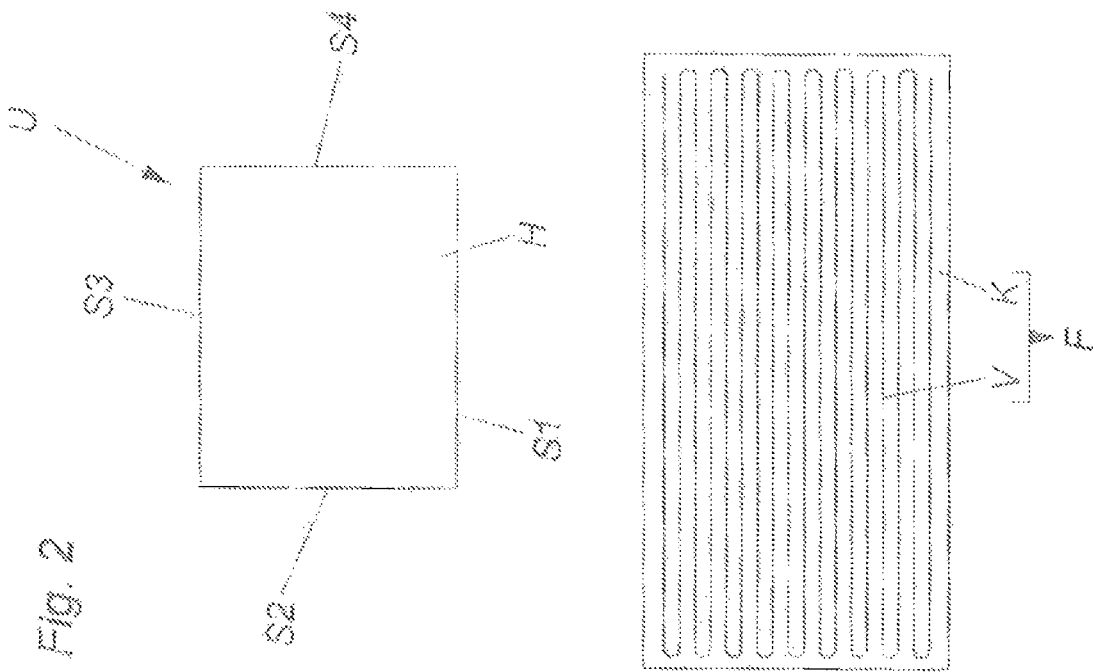
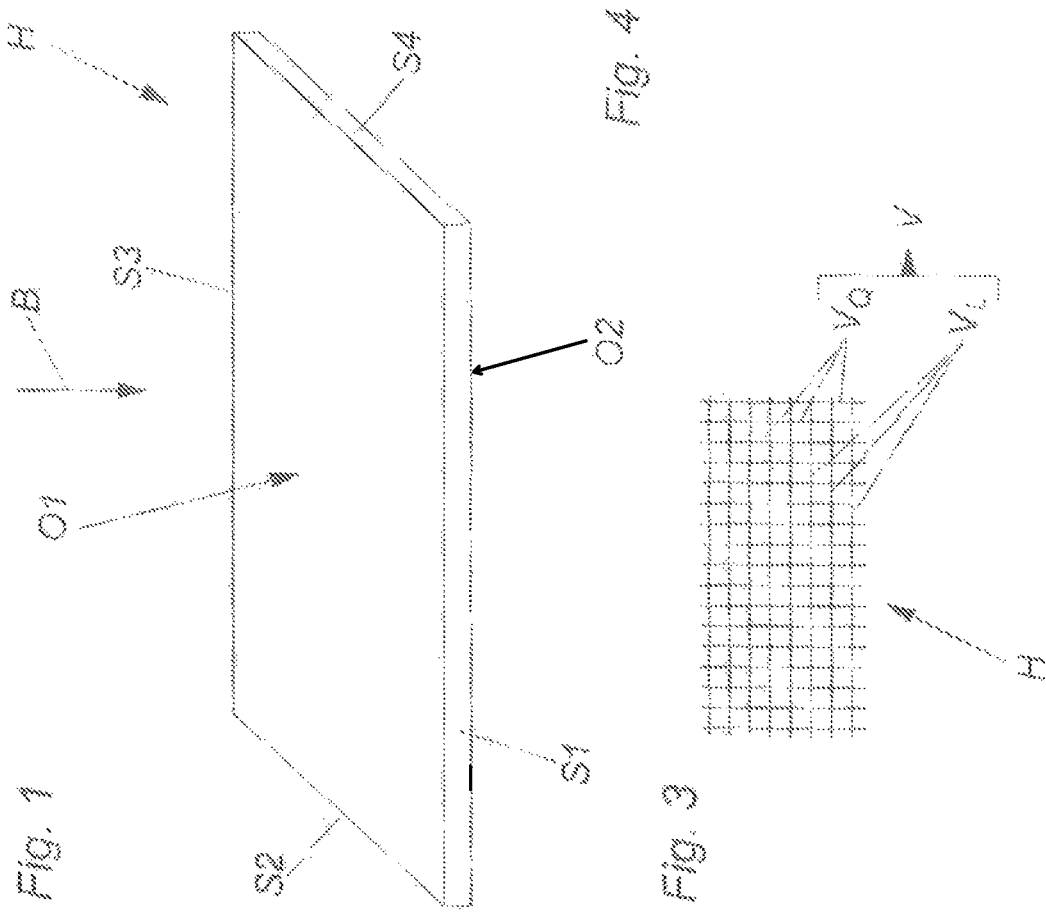

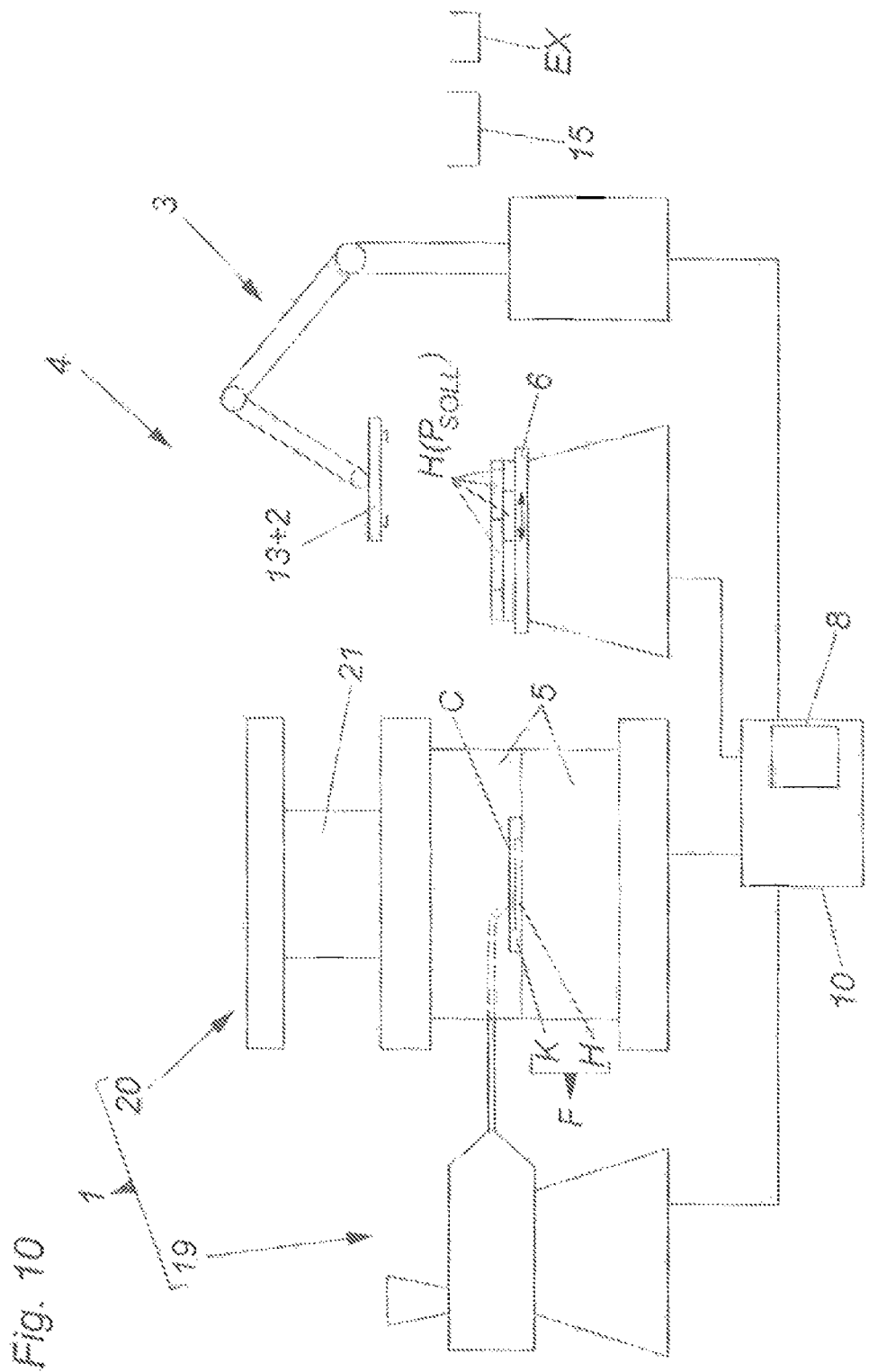

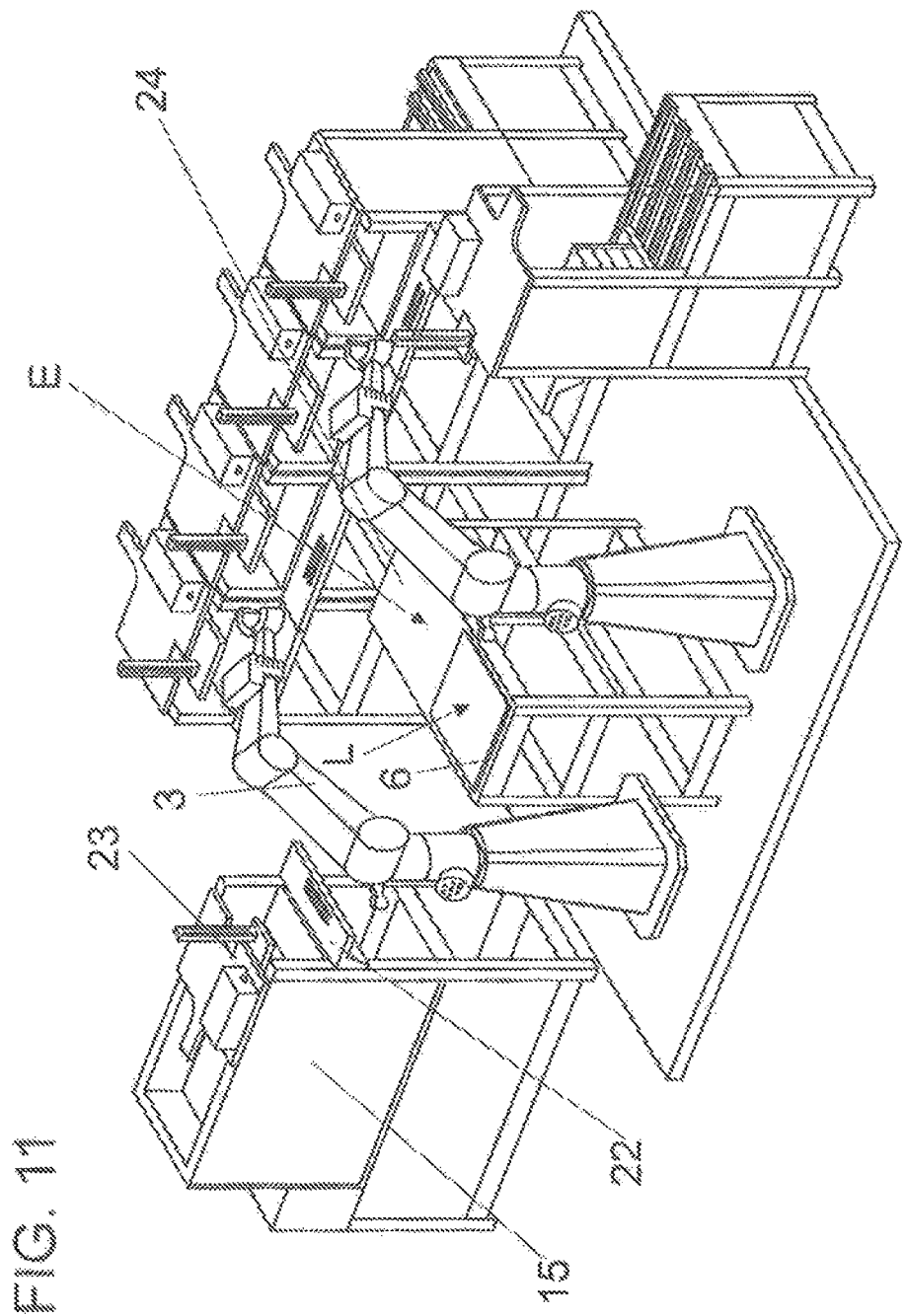

METHOD FOR ARRANGING SEMI-FINISHED PRODUCTS

BACKGROUND OF THE INVENTION

The present invention concerns a method and a device for arranging, in particular thermoplastic, semi-finished products. The invention further concerns molding process for the production of a molding part in a molding installation as well as molding installation for producing a molding part, comprising a molding machine, in particular an injection molding machine.

The molding technique is used more and more often in order to produce molding parts which meet the demands for the lightweight construction. Thus, such molding installations appropriate for the lightweight construction are increasingly used in the vehicle manufacture. In order to operate a lightweight construction, more and more often molding parts in the form of fiber-reinforced plastic materials, in particular unidirectional fiber-reinforces plastic materials (tapes), are used. Primarily, glass fibers and carbon fibers are used for this purpose as reinforcement fibers which are embedded in a thermosetting or thermoplastic matrix. The tapes, thus, have the mechanical characteristics of the fiber in the direction of the fibers and the mechanical characteristics of the matrix transversely to the fibers. The mechanical characteristics of the matrix are significantly below the mechanical features of the reinforcement fiber. When taking into account this fact, then it is possible to tailor a material by adapting the fiber orientation to the demanded mechanical requirements.

In each of the documents WO 2009/042225 A1 and WO 2013/016487 A1 a solution for the production of semi-finished products is provided. A fiber-reinforced semi-finished product serves as a source material which is unwound from a spool, cut to length and placed on a tool surface in a defined manner. When placing the tapes on the tool surface, the tapes are fixed and subsequently welded. Here, most varied fiber angles can be realized as the tool surface can be rotated about the Z-axis. Thus, tailored semi-finished products can be produced with this process, wherein thickness jumps as well as most varied fiber angles are possible.

In the document AT 514721 B1 a method is described which works according to the pick-and-place process. Here, tapes are taken from a depot by a handling, the orientation of the tapes is optically verified and the position/orientation can be corrected online during the placing. A control program for the placing position is stored and the placing position can be adapted based on the position data from the image processing. Among others, this invention is about substantially improving the placing by adjusting the placing data by means of an intelligent controlling.

Further, the AT 518548 A4 shows a handling device for insert parts with a movement apparatus and a transfer head. Here it is especially about an illumination device for illuminating a taken insert part from a side which is facing the transfer head. Thereby, a more precise positioning of the insert part is reached.

In the known state of the art, indeed, a relative precise positioning is possible, however, problems can occur when the individual semi-finished products deviate from an ideal form. Thus, in particular when producing molding parts from several semi-finished products placed side by side, it can occur that individual semi-finished products are at least partly overlapping each other or that the distance between the individual semi-finished products are too large at least partially. Therefore, the mechanical stability of the so constructed molding part can be massively reduced.

SUMMARY OF THE INVENTION

The object of the present invention, thus, is to provide a method and a device where—also semi-finished products which deviate from an ideal form—can be positioned with an increased accuracy; this means with as few or as small overlaps and gaps as possible to an adjacent semi-finished product.

This object is carried out by using an electronically controlled or regulated placing device for the semi-finished products, comprising the following steps detecting of at least one part of an outline of a semi-finished product to be placed, wherein the detecting is carried out by a detection device, determining a target position for the semi-finished product and/or for the placing device (in particular for a handling device of the placing device) for placing the semi-finished product by matching the at least one part of the outline with a placing edge occurring on an underlying surface and placing the semi-finished product by the placing device using the target position.

With regard to the device, the controlling or regulating unit is configured to determine a target position for the semi-finished product and/or for the placing device by matching the at least one part of the outline with a placing edge occurring on an underlying surface and to use the target position when controlling or regulating the device for placing the semi-finished product. The controlling or regulating unit can also be named as closed loop or open loop control unit.

The semi-finished products are placed on an underlying surface. The underlying surface, for example, can be formed by a placing table or by semi-finished products already placed previously. The placing edges are created either by edges or borders of already placed semi-finished products or by other structures present at the underlying surface, as for example limit stops or the like. The matching can be carried out by minimizing the gaps between the semi-finished products or a defined extent of a gap or of an overlap can be provided.

The outer dimensions of the semi-finished product to be placed can be changed by the solution according to the invention and, however, it can still be guaranteed that the semi-finished products do not overlap or do not comprise gaps which would have an adverse effect on the mechanical characteristics.

All of the described exemplary embodiments (together with respective advantages) of the method count in an analogous manner also for the device—and vice versa.

The target position for the semi-finished product or the placing device can contain position parameters as well as angle parameters. Preferably, these parameters—preferably entirely—determine the desired position of the semi-finished product to be placed or alternatively the position of the placing device in a placing position.

According to the invention, the arranging or placing of the at least one semi-finished product, for example on a placing table, is carried out depending on the target position. This target position can be separately determined for each semi-finished product. In the case of (from cycle to cycle) individually formed molded parts, the target position of each semi-finished product to be placed can also be newly determined in each cycle depending on an already previously (and adjacent) placed semi-finished product. Here, for each semi-finished product the detected outline and optionally the detected position/orientation (and optionally also the orientation or running direction of the reinforcement fibers) of at least one previously placed semi-finished product and of the semi-finished product just being placed can be taken into consideration.

With the invention, it is possible to place the semi-finished products with a higher precision relative to teach other. This leads to more error-free semi-finish product lay-ups and—if the semi-finished product lay-up is used in a downstream molding process—to molding parts with improved mechanic characteristics.

It was already mentioned that unidirectional fiber-reinforces semi-finished products can be named as tapes. If such tapes are used in a method according to the invention, it is referred to as "tape laying" or "tape placing".

The detection device can be formed as an optical measuring system, preferably as a camera. For the monitoring of the position, however, also other sensor systems can be used (based on pressure, capacity, induction, resistance, ultrasound, radar).

Generally, the semi-finished product can have every arbitrary form which is suitable for being used in a subsequent molding process. Preferably it is provided that the semi-finished product is formed flat. In particular, the semi-finished product comprises an upper side, a bottom side and lateral edges. In this case, flat means that the semi-finished product is formed plate-shaped. A flat semi-finished product can be defined in that the thickness/height of the semi-finished product comes to maximally 10%, preferably maximally 5%, particularly preferred maximally 3%, of the length and/or of the width of the semi-finished product. When semi-finished products in the form of so-called tapes are used, these tapes often have standardized length of 80 mm, 160 mm, 320 mm and so forth.

The outline of an object is formed by the outer edges or lines which define the form of an object for an observer. The outline of an object, thus, does not only depend on the form of the object, but also depends on the direction from where an observer is viewing the object. Other names for the outline are contour or silhouette.

Preferably, the detecting of the at least one part of the outline of the semi-finished product is carried out from a detection viewing direction which is oriented substantially rectangular to the upper side or to the bottom side. Thereby, the lateral edges—which usually form the placing edges—form the outline of the semi-finished-product. Expressed with other words, the viewing axis of the camera shall be normal to the object to be picked up; this means to the upper side or the bottom side of the semi-finished product.

In principle, it is possible that the detecting of the outline of the semi-finished product is already carried out directly after the production of the semi-finished product or in a store. This means that the analysis of the outline of the semi-finished product can be carried out locally and/or timely separated from a later molding process. Thus, for example in a store (semi-finished product depot) in which the semi-finished products are stacked or can be stored, a pre-selection and subsequent matching can be carried out by a detection device. The outlines or partial outlines of all analyzed semi-finished products can be saved correspondingly. Preferably it is provided that the detecting and matching is carried out locally and/or timely directly upstream to the subsequently effected molding process. Particularly preferred it is provided that prior to the detecting and matching the semi-finished product is picked up by the placing device and is moved to the detection device. For an easy and time-saving procedure, it can be provided that the semi-finished product is held by the placing device when detecting the at least one part of the outline of the semi-finished product. Particularly preferred an illumination device for illuminating the at least one held semi-finished product is provided, wherein by the illumination device the at least one held semi-finished product can be illuminated from a side of the held semi-finished product (corresponds to an insert part) facing towards a transfer head of the handling device. The outline of the semi-finished product can be detected particularly well by such an illumination device as the distinction to the background is still sharper and more detailed.

Preferably, the detecting of the at least one part of an outline of a semi-finished product to be placed is carried out when the semi-finished product is lying on a detection surface, preferably formed on a camera table and preferably pressed onto the detection surface (by the placing device) substantially over its entire surface. Preferably it is provided that the detection surface is formed by a transparent plate. For example, the transparent plate can be made of glass or plexiglass. Thereby, the detection surface is transparent for the optical measuring system. Particularly preferred the detection device comprises the detection surface formed as a transparent plate and the optical measuring system, preferably arranged below the transparent plate, directed onto the detection surface.

Further, preferably the placing device comprises a placing surface—preferably formed on a placing table—for the semi-finished product. The semi-finished product can by placed onto the placing surface by the handling device of the placing device. Several semi-finished products are then placed and assembled on this placing surface. The placing surface forms the underlying surface for placing the semi-finished product. A semi-finished product placed on the placing surface forms the placing edge occurring on an underlying surface for a semi-finished product to be placed subsequently.

According to a particularly preferred exemplary embodiment, the detection surface of the detection device is formed separate from the placing surface of the placing device and is arranged distanced to the placing surface. Therefore, the outline detection can be carried out locally (and timely) separated from a (subsequent) placing of the semi-finished product on the placing surface of the placing table.

Not only the outline of the semi-finished product can be detected by the detection device, rather the position and/or orientation of the semi-finished product is determined from the detected outline. This is carried out preferably relative to a reference mark formed on the placing device. Preferably it can be provided that by a measurement (in particular by a camera shot) a relative position between (the transfer head of) the handling device and the at least on picked-up semi-finished product can be determined, wherein the relative position is considered during the controlling or regulating of the placing of the picked-up semi-finished product.

The position or orientation determined in this manner can be used for the determination of the target position.

The detection comprises an optical sensor, in particular a camera, as well as an illumination device.

Here, an illumination device can be used where a spectral distribution of the emitted electromagnetic radiation is adapted to an absorption spectrum of the semi-finished product in such a way that a contrast ratio of the images captured by the optical measuring system is optimized. In simple terms, the color of the light which is used for the illumination of the semi-finished product can be adapted to the color of the semi-finished product in such a way that the contrast ratio is optimized.

In order to produce a mechanically stable molding part, however, it is not only important that no overlapping or too large distances between the inserted semi-finished products is given, but that also the arranging and orientation of the reinforcement fibers of the semi-finished products arranged side by side does not lead to a negative mechanic influence in the molding part being produced. Therefore, it is preferably provided that the running direction (and the orientation respectively) of the reinforcement fibers is detected by the detection device, and the semi-finished product is sorted out when the detection device detects that the gaps between the reinforcement fibers are too large. Also for this analysis an already described illumination device can be used. In order to detect said too large gaps, also for this analysis a corresponding reference area (e. g. in the form of a not to be exceeded, maximal distance between the individual fibers measured across the longitudinal direction of the fibers) can be stored. That is to say, the semi-finished product is sorted out if the semi-finished product comprises such a too large distance. The orientation of the fibers can be detected particularly well when the detection device comprises an illumination device so that a particularly good contrast is reached between the fibers and area surrounding the fibers. Preferably, by the detecting a (two-dimensional) data set is provided which represents the orientation of the individual fibers. In the case of a semi-finished product comprising a fabric, thus, normally a pattern with checkered lines is obtained.

During the placing, the semi-finished product is sucked by means of a vacuum—preferably substantially over the entire surface—onto a plate, preferably forming a placing surface of a placing table.

Practically all of the previously described steps can be carried out independent from a molding process. Preferably, however, the method according to the invention for arranging semi-finished products is installed upstream (similar to an upstream sorting-out method) to a molding process, in particular a plastic molding process, for the production of a molding part in a molding installation, wherein the molding installation comprises a molding machine, in particular an injection molding machine, and a placing device with a handling device. Accordingly, this molding process comprises the following steps:

carrying out a method according to the invention for arranging semi-finished products, inserting at least one semi-finished product, which has been made available for use, into a molding tool of the molding machine, closing the molding tool, whereby the at least one semi-finished product is at least partially situated in a cavity of the molding tool, introducing a liquid molding material, in particular a plastic melt, into the cavity, at least partially hardening of the introduced liquid molding material together with the at least one semi-finished product to form the molding part, opening of the molding tool, and removing the molding part (F) from the molding tool (5).

In the case of this molding process, molding parts preferably in the form of fiber-reinforced plastics (FRP) consisting of reinforcement fibers and a polymer matrix can be produced, wherein the reinforcement fibers (together) form the semi-finished product, while the polymer matrix forms the liquid molding material. Usually, fiber-reinforced plastics comprise high specific rigidities and high specific strengths. As a consequence, such FRP are suitable materials for lightweight constructions. Flat structures are produced predominantly out of fiber-reinforced plastics.

Reinforcement fibers—which form the semi-finished products or which form the substantial part of the semi-finished products—can be selected from the group consisting of inorganic reinforcement fibers (e. g. basalt fibers or glass fibers), metallic reinforcement fibers (e. g. steel fibers), organic reinforcement fibers (e. g. aramid fibers, carbon fibers, polyethylene fibers), natural fibers (e. g. flax fibers, wood fibers) or mixtures thereof. As the individual fiber filaments are mostly difficult to handle, the dry fibers are assembled to semi-finished products. The production methods derive in large parts from the textile industry as for example the weaving, the braiding, or the embroidering. Thus, woven fabrics, laid fabrics, embroidered fabrics, meshed fabrics, mats, non-woven fabrics or the like can be used as semi-finished products. Also pre-impregnated semi-finished products as for example glass mat reinforced thermoplastics, long-fiber reinforced thermoplastics, sheet molding compounds (SMC), prepregs with preferably unidirectional continuous filaments, a bulk molding compound (BMC) or similar products can be used as semi-finished products.

A thermoplastic matrix (e. g. based on polyetheretherketone or polytetrafluorethlyene) or a thermosetting matrix (e. g. based on epoxy resin, polyester resin, polyurethane, amino resin) can be used as polymer matrix.

Injection molding machines, injection presses, presses or similar can be understood as molding machines. Plastic molding processes are processes where e. g. thermoplastic material, reactive components which crosslink to plastics, or the like are formed in a molding tool. When further processing the semi-finished products arranged on one another, however, also reshaping steps can be carried out in the molding machine (Example: reshaping or back-injection molding in an injection molding machine or in an injection molding tool respectively).

Further process steps can take place between the arranging of the semi-finished products according to the invention and the molding process, as for example punctual welding of the arranged semi-finished products (e. g. on the placing table), at least partially—preferably completely—consolidating of the arranged semi-finished products, warming of the arranged semi-finished products, and the like.

The semi-finished products can be stamped and/or stored in a store previous to the method for arranging the semi-finished products according to the invention.

However, there is also the possibility that at least on semi-finished product spool is inserted in the store and that the semi-finished product is created by unwinding and cutting.

In a preferred exemplary embodiment the semi-finished products—preferably previous to the injection of the plastic matrix—are individually placed based on the exactly detected form of each semi-finished product. In other words, the semi-finished products are combined or assembled in the form of a puzzle, wherein the semi-finished products are placed while avoiding overlaps or gaps between the semi-finished products. That is, it can be provided that the target position for the semi-finished product and/or for the placing device for placing the semi-finished product is determined in such a way that when placing the semi-finished product gaps are prevented between the semi-finished product and an already previously placed semi-finished product and/or an overlapping is prevented between the semi-finished product and an already previously placed semi-finished product. In particular, in this way the semi-finished products can be placed flush to each other.

In principle, it is possible that the detecting of the outline of the semi-finished product is carried out only during placing in the molding tool or on the placing table. Generally, it is possible in this way that the outline of several (or even all) semi-finished products to be placed in the molding tool or on the placing table can be analyzed simultaneously. This leads to the advantage that the outline can be compared with the outline of an adjacent placed semi-finished product. It is disadvantageous, however, that the sorting out of a semi-finished product which does not meet the criteria is carried out quite late in the molding process. This can lead to a prolongation of the cycle time.

According to a preferred exemplary embodiment, the placing device comprises a handling device. This handling device serves for handling, preferably picking up, transporting and placing, the semi-finished product. Moreover, it is preferably provided that the placing device also comprises a placing table.

Preferably, the position and/or orientation of the semi-finished product relative to a reference mark, preferably form on the placing device or on the handling device respectively, can be detected by the detection device. The reference mark can be dot-shaped. However, the reference mark can also have all other geometric forms by which the relative location of the outlines, positions and orientations can be determined in an easier manner. Expressed differently, it can be provided that a position and/or an orientation of the semi-finished product, preferably relative to a reference mark formed on the placing device, are/is determined from the detected outline.

Further, the target position for the semi-finished product and/or for the placing device are/is determined from the position and/or the orientation of the semi-finished product.

An individual memory can be provided for the data which define the outline reference range. Preferably it is provided that the outline reference range is stored in a memory of the controlling or regulating unit. Alternatively, the outline reference range can also be stored in a cloud.

In a particular preferred exemplary embodiment, the detection device comprises an optical measuring system, in particular a camera. It is possible, in particular by utilizing a reference mark with the camera shots, to associate a position data to the pixels (preferably to each individual pixel). Therefore, it is possible in a particular easy manner to detect the outlines, positions and/or orientations of the semi-finished products, as for each pixel, which is associated to the semi-finished product in a camera shot, the position data is known.

The detection device can also comprise an illumination device for a good and safe detection of the outline. According to a preferred exemplary embodiment, an illumination device is used, where a spectral distribution of the emitted electromagnetic radiation is adapted to an absorption spectrum of the semi-finished product in such a way that a contrast ratio of the images captured by the optical measuring system is optimized.

A comparison of the detected outline with a stored or saved outline reference range and/or a comparison of a measurement of the semi-finished product determined from the detected outline with a saved reference measurement range is carried out, wherein depending on a result of this comparison either a sorting out of the semi-finished product is carried out when the detected outline of the semi-finished product lies at least in sections beyond the outline reference range or the measurement of the semi-finished product lies beyond the reference measurement range, or the semi-finished product is made available for the use in a molding process when the determined outline of the semi-finished product lies within the outline reference range or the determined measurement of the semi-finished product lies within the reference measurement range.

Expressed differently, the controlling or regulating unit is configured to carry out a comparison of the detected outline with a saved outline reference range and/or a comparison of a measurement of the semi-finished product determined from the detected outline with a saved reference measurement range, and, depending on a result of this comparison, either to move the semi-finished product by the placing device into a sorting-out area when the detected outline of the semi-finished product lies at least in sections beyond the outline reference range or the measurement of the semi-finished product lies beyond the reference measurement range, or to move the semi-finished product by the placing device into a making-available area when the determined outline of the semi-finished product lies within the outline reference range or the determined measurement of the semi-finished product lies within the reference measurement range. Thereby, inappropriate (for example frayed or deformed) semi-finished products can be easily eliminated. Corresponding implementations can be used in a particular advantageous manner with the reference range for the semi-finished products.

Finally, protection is also sought for a molding installation for the production of a molding part, wherein this molding installation comprises a molding machine, in particular an injection molding machine or an injection press, and a device according to the invention for arranging thermoplastic semi-finished products.

The molding installation can comprise an installation control unit known per se. All processes carried out on the molding installation can be centrally controlled with such an installation control unit. Depending on the advantages of the design for the individual construction and for the processes to be carried out, the controlling or regulating unit of the device for arranging semi-finished products is signally connected with the installation control unit or is integrated into the installation control unit. In the second case, a sequence program of a corresponding (semi-finished products preparation) operating mode can be saved in a memory of the installation control unit.

The whole invention including the preferred exemplary embodiments can also be described with the following words.

In order to increase the precision of the placing of the semi-finished products, a monitoring of the picking-up position or of the position of the semi-finished product on the transfer head (handling device) is necessary. For the monitoring of the position either optical or sensitive systems (based on pressure, capacity, induction, resistivity, ultrasound, radar) can be used.

The outer dimensions of the semi-finished products (outlines) and at least one reference mark (also denoted as reference element) are detected by the mentioned systems. This information is subsequently converted into a binary image or into data, which are configured to determine the two-dimensional form (corresponds to the outline) and the location (corresponds to the position and the orientation) of the semi-finished product and of the at least one reference mark. During the conversion of the (camera) shot into the binary image, length information can be associated to each individual pixel and, thus, it is possible to determine the lengths or distances. With the help of this information it is possible to evaluate the semi-finished products based on their actual length. It can be evaluated whether the semi-finished product can be used or whether it has to be sorted out.

In order to receive excellent edge sharpness when converting the picture into a binary image, the contrast between the semi-finished product and the background can be important. In the binary image the outline of the body is searched by means of grey level differences. Only if the contrast is very high, also the grey level differences are accordingly high and, thus, the edges or the outline can be determined exactly. The outline of the binary image comprises a plurality of pixels which—in an ideal case—are all adjacent and which result in an arbitrarily directed (for example oblique) straight line. In a real case it can of course occur that the pixels do not result in a straight line, but result in a for example sinusoidal curve. In this case, the software has many possibilities to manage it. Some examples are listed in the following (incomplete list):

- The two corner points of an edge can be searched and a straight line can be formed between them.
- All of the valleys and peaks can be considered and an average value can be formed.
- The straight line can be put onto the valleys only.
- The straight line can be put onto the peaks only.
- A polynomial can be formed which describes a straight line or a curve or a spline.

If form and location are known, the semi-finished product can be placed in an exact manner. This is of an enormous significance when producing a multilayer semi-finished product lay-up, as the maximal performance can be reached especially when the individual semi-finished products are placed to each other in an optimized manner. In order to reach the best mechanic characteristics, therefore, the placing position is adjusted in an intelligent manner. This means that the size of the semi-finished product as well as the running direction of the reinforcement fibers is taken into consideration when placing the semi-finished product. If several semi-finished products are placed which have the same fiber running direction, these semi-finished products have to be placed in such a way that preferably no gap or only very little overlaps occur between the semi-finished products. In order to make this possible, position information or outline information of the at least placed semi-finished product as well as of the semi-finished product just being placed are necessary. Here, different approaches can be taken. Either there are several measuring systems in the semi-finished product placing compartment (placing table), which determine the positions of the already placed semi-finished product and of the semi-finished product just being placed, or only one measuring system is used and the position of the most recently placed semi-finished product is saved in a memory or temporary memory. Thus, it is consecutively possible that the outline data and the position data/orientation data of the already placed semi-finished product is analyzed together with the outline data and the position data/orientation data of the just picked-up semi-finished product. The just picked-up semi-finished product can be placed in such a way that as far as possible no gap appears between the semi-finished products. Particularly preferred, the placing edges are positioned to each other when placing. Placing edges are edges which have to be flush to each other after the placing.

A gap between the semi-finished products has to be prevented as the gaps can hardly be closed later and, thus, defects can be left behind in the component. Such defects can severely adversely affect the component characteristics In order to reach the best mechanic characteristics, the image processing or the sensitive outline detection offers further advantages which can be employed. In order to increase the quality and, thus, the mechanic characteristics, boundary samples of the geometries to be placed can be saved or stored in the controlling or regulating unit. Therefore, it is possible for the controlling or regulating unit which creates the binary image or the data set, to discard the erroneous semi-finished products. Erroneous geometries can differ too much from a target geometry. Here, in particular critical are angle deviations of the placing edges or of the geometry of the placing edges. If the placing edge is for example wavy instead of linear, this can lead to problems when placing. Thus, it is better to sort out such semi-finished product cuttings at an early stage.

Particularly preferred, the inspection of the semi-finished products is carried out with an optical measuring system. It is additionally possible that not only the dimensions, but also the quality of the semi-finished products concerning the uniformity of the fiber distribution can be checked. If the fibers are distributed in a non-uniform manner, this can result in repeatedly occurring matrix alleys which have a negative mechanic impact. Such matrix alleys can be displayed by a perfect interaction between the optical measuring system and the illumination technique and, thus, semi-finished products with too large or too many matrix alleys can be sorted out. Further, also the fiber orientation within the semi-finished product can be checked and monitored.

Excitation sources, which can emit visible light, can be used as illumination sources. Particularly preferred is an illumination device which emits rays with a color adapted to the color of the semi-finished product in order to maximize the contrast during the image capturing. Therefore, the color of the semi-finished product is determined previous to the illumination and is transmitted to a controlling or regulating unit. Subsequently, the controlling or regulating unit can adjust the illumination in such a way that the contrast is maximized and, thus, the edge detection or also the detection of matrix alleys is improved. The adjusting of the illumination is highly interesting for hybrid component structures, as different fiber semi-finished products comprise significant color differences. The semi-finished can absorb visible light not at all (white object) or can absorb visible light partially or completely (black object).

In order to determine the component dimensions (outline) or the location of the semi-finished product in an optimal manner, it can be important that the semi-finished product is situated in a stretched position, whereby the real dimensions can be detected or measured. In order to bring the semi-finished product into a stretched condition, different possibilities can be considered. On the one hand, the semi-finished product can be sucked over the entire surface by means of a negative pressure or vacuum. A further preferred embodiment provides that the semi-finished product is not sucked over the entire surface, but that the semi-finished product is pressed against a plate which is at least partly transparent for the optical measuring system. Thus, the semi-finished product is stretched. In order to prevent pollution of this transparent plate and, thus, to prevent the development of incorrect information during the image capturing as well as during the image analysis, in a preferred variant the transparent plate is flushed with compressed air after each image capturing and is cleaned from dust particles, fibers or possible artifacts. Also combinations of different handling or gripping devices are possible which are suitable for stretching the semi-finished product.

Concerning the molding process it can be referred to a preferred exemplary embodiment: The semi-finished products are picked-up from a depot or store. After the picking, the outline or the position/orientation of the semi-finished product is either determined directly at the transfer head or at an intermediate position. In the simplest case, the intermediate position can be the store or the picking position of the semi-finished product. However, the intermediate position can also be beyond the store. This can be the case, for example, when the semi-finished products are picked by a transfer gripper or by an external picking unit from the store and are transported to an intermediate position/picking position. If the position on the transfer handling or on the intermediate position is known, the placing position of the semi-finished product can be determined by taking into consideration the real dimensions or the real location on the transfer handling. This process can be completely repeated until the lay-up is fully placed or completely established. The bottom-most semi-finished product lay-up layer is held in its position, preferably by a vacuum plate. All other semi-finished product lay-up layers are connected to the underlying semi-finished product by a joining method.

BRIEF DESCRIPTION OF THE DRAWINGS

Further details and advantages of the present invention are described more fully hereinafter by means of the specific description with reference to the embodiments illustrated in the drawings, in which:

FIG. 1 is a perspective view of a semi-finished product,

FIG. 2 is a top view onto the semi-finished product, whereby the outline is apparent, FIG. 3 is a top view onto a semi-finished product in the form of a woven fabric, FIG. 4 is a top view onto a molding part, FIG. 10 is a schematic view of a molding installation, and FIG. 11 is a perspective view of the device for preparing semi-finished products with a picking table, a camera table and a placing table.

DETAILED DESCRIPTION OF THE INVENTION

FIG. 1 is a perspective view of a flat semi-finished product H. This semi-finished product H comprises an upper side O1 as well as a bottom side O2. The circumferential borders of this semi-finished product H are formed by the lateral edges S1, S2, S3 and S4.

When looking from above (corresponds to the detection viewing direction B) onto this semi-finished product H, the outline U is visible, as for example shown in FIG. 2. This outline U of the semi-finished product H is assembled by the four lateral edges S1 to S4.

FIG. 3 shows a top view onto a flatly formed semi-finished product H. In this case, the semi-finished product H is formed as a woven fabric and consists of a plurality of reinforcement fibers V. These reinforcement fibers V are grouped in longitudinal fibers $V_L$ which are oriented parallel to each other and in transverse fibers $V_Q$ which are oriented perpendicular to the longitudinal fibers $V_L$. Of course, the individual fibers V can also be arranged in other forms than shown in FIG. 3. The reinforcement fibers V can also be pre-impregnated.

FIG. 4 shows a molding part F which is produced in a molding process. This molding part F comprises on the one hand the reinforcement fibers V and on the other hand the initially liquid and the hardened molding material K. In the shown embodiment, the reinforcement fiber V is arranged in serpentines. Such a molding part F forms a fiber-reinforced plastic which is especially used in lightweight construction.

However, mostly not only one semi-finished product H is used for the production of fiber-reinforced plastic, but a plurality of semi-finished products H are placed in a determined arrangement adjacent to each other and/or above each other. Thereafter, this plurality of semi-finished products H is overmolded by the liquid molding material K. This arranging of semi-finished products H is also known as a semi-finished products lay-up.

Figure 5:
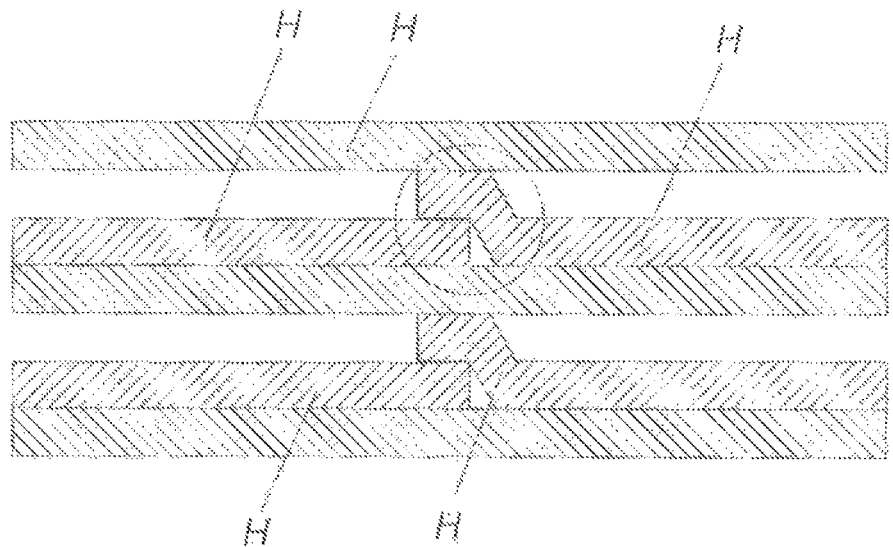
FIG. 5 is a cross section through a semi-finished product lay-up according to the state or the art with undesired overlappings.

As shown in FIG. 5, undesired overlappings (see encircled area) can occur when placing several semi-finished products H. Because of such overlappings, the wall thickness of the semi-finished product lay-up can be increased locally by a multiple. Subsequently, this can lead to problems during the consolidation of the semi-finished products H, as these overlappings are not considered during the consolidation. Thus, a massive pressure increase can occur locally, which leads to a "fiber swimming" during the consolidation. This, in turn, has a negative influence on the mechanic characteristics of the emerging molding part F and on the component made thereof, respectively.

Figure 6:
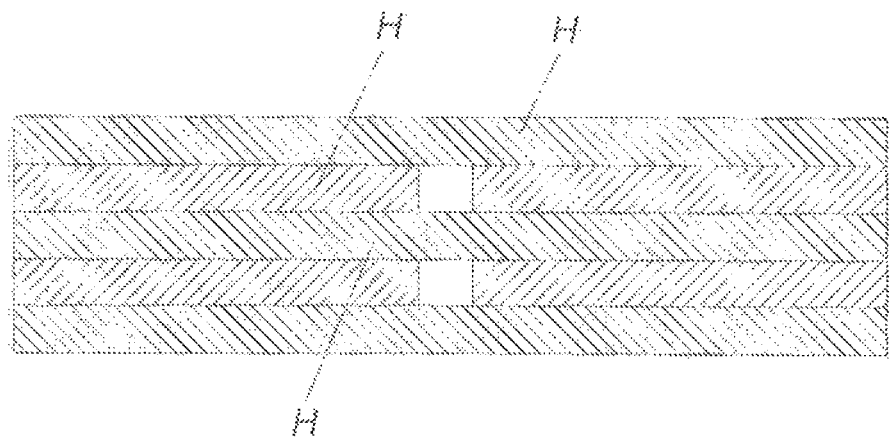
FIG. 6 is a cross section through a semi-finished product lay-up according to the state of the art with undesired gaps.

FIG. 6 shows another negative case which was occurring during the production of molding parts F from semi-finished products H. In this case, the semi-finished products H are not placed edge to edge, whereby a gap emerges. In the better case, this gap is filled with polymer matrix. In a worse case, even an alley (or hole) without a polymer matrix or without a fiber, remains in the component. In both cases the mechanical characteristics are massively restricted.

A method and a device 7 according to the invention are provided in order to a priori exclude such cases.

Figure 7:
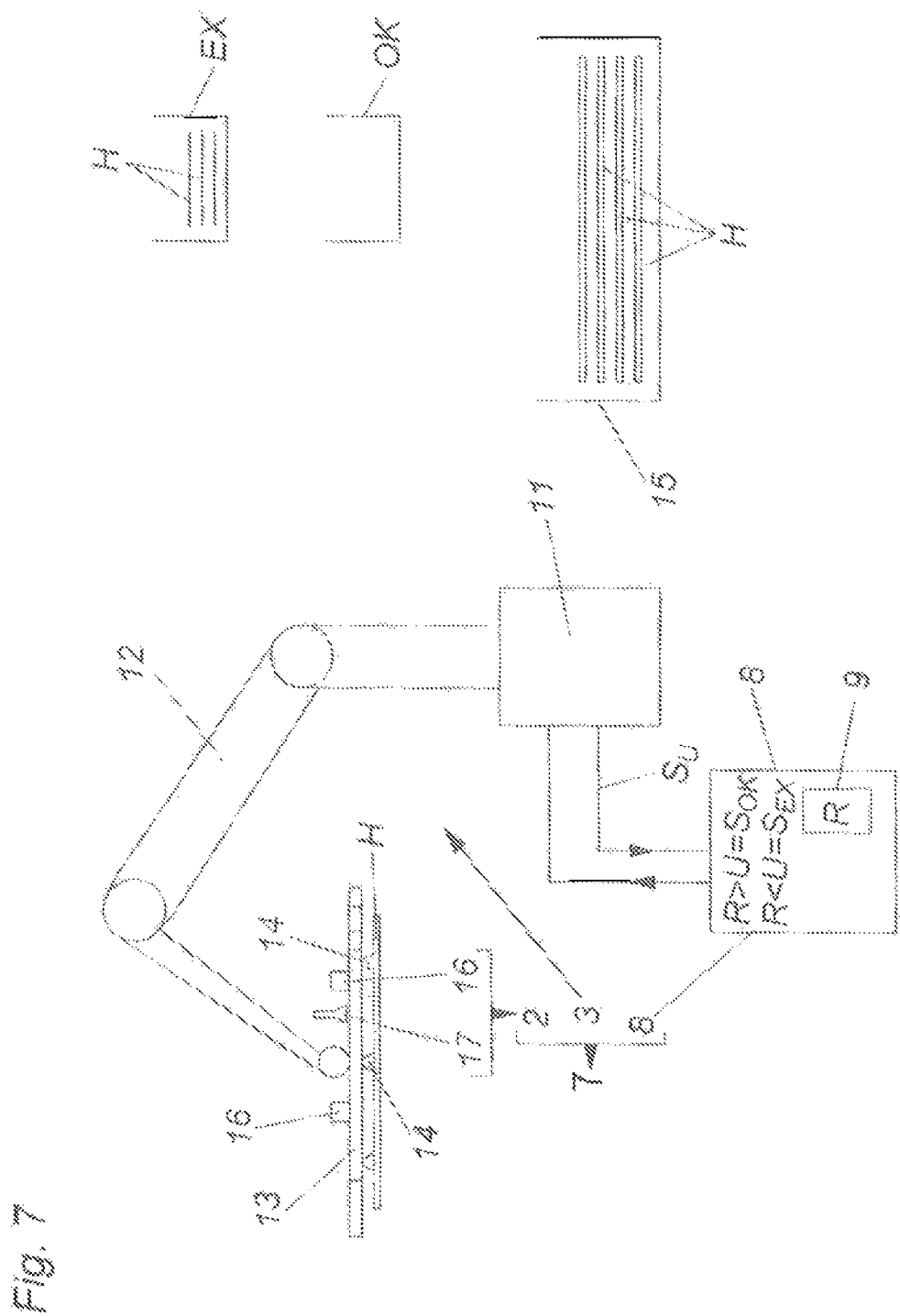
FIG. 7 is a schematic view of a device for arranging semi-finished products for a molding process.

FIG. 7 schematically shows a detection device 2 and a controlling or regulating unit 8. These two components—in this case together with a placing device which comprises a handling device 3—together form the device 7 for arranging semi-finished products H for a molding process. The handling device 3 comprises a socket 11, the handling arm 12 supported movably on the socket 11 and the transfer head 13. Holding elements 14 (e. g. in the form of vacuum suction cups) are arranged on the transfer head 13. A semi-finished product H can be picked up from the semi-finished product store 15 with such a holding element 14. At least one illumination device 16 and a recording device 17 (e. g. an optical measuring system, preferably a camera system) of the detection device 2 are arranged on the transfer head 13. The semi-finished product H is illuminated by the illumination device 16 in such a way that especially the outline U of the semi-finished product H can be visually detected by the recording device 17. The detection device 2 is signally connected to the controlling or regulating unit 8. An outline reference range R—preferably adjustable by a user—is saved in a memory 9 of the controlling or regulating unit 8. A signal Su representing the outline U is transmitted to the controlling or regulating unit 8 by the recording device 17 of the detection device 2. The outline U is compared with the outline reference range R in a comparing unit of the controlling or regulating unit 8. If the outline U is arranged at least partially beyond the outline reference range R, a signal $S_{EX}$ for sorting out the semi-finished product H is outputted. By means of the output of the signal $S_{EX}$, the semi-finished product H is moved by the handling device 3 into the sorting-out area EX and is dropped therein. In contrast, if the outline U is within the outline reference range R, a signal $S_{OK}$ for making available the semi-finished product H for a molding process is outputted. By means of the output of this signal $S_{OK}$, the semi-finished product H is moved by the handling device 3 into the making-available area OK or directly to the placing table 6 and is placed thereon.

Figure 8:
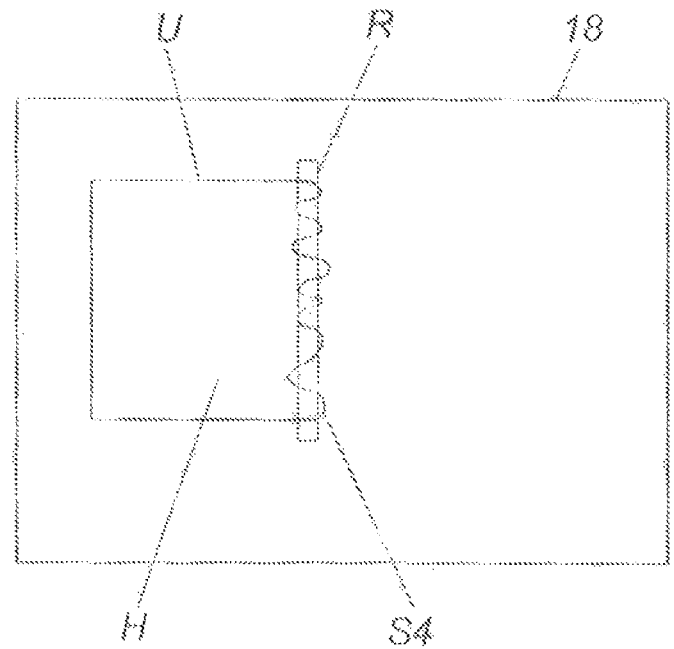
FIG. 8 is a schematic top view of a semi-finished product with unsuitable lateral edges.

FIG. 8 schematically shows a recording area 18 of the detection device 2. After the flat semi-finished product H has been moved into this recording area 18, the outline U of this semi-finished product H is at least partially compared with the reference range R by the recording device 17. It schematically follows from this FIG. 8 that the right side edge or placing edge (corresponds to the lateral edge S4) of the outline U at least partially lies beyond the reference range R (which is freely selectable by a user). This reference range R can also be referred to as tolerance field.

Figure 9:
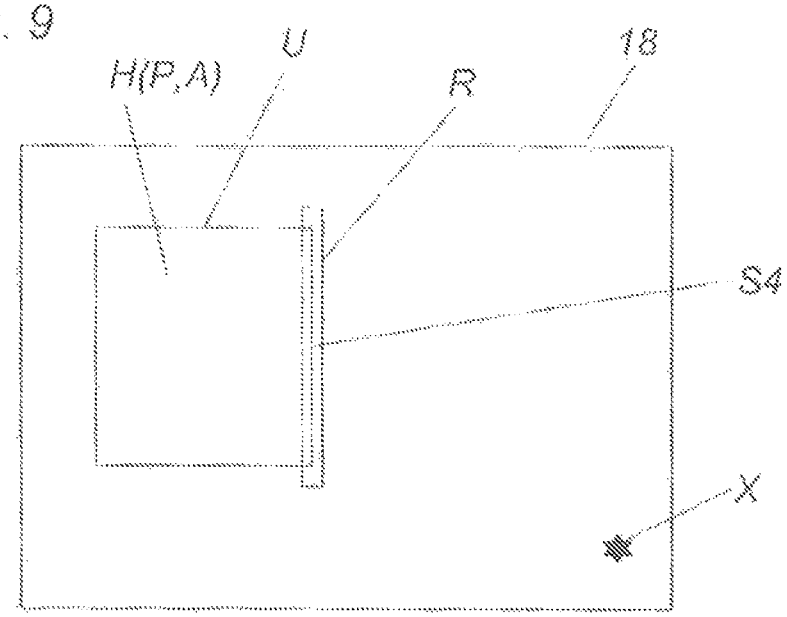
FIG. 9 is a schematic top view of a semi-finished product with appropriate lateral edges.

FIG. 9, in contrast, shows a case in which the right lateral edge of the outline lies completely within the reference range R. A semi-finished product H which is formed in such a way, thus, can be further processed. FIG. 9 also shows that by means of the detection device 2 the position P and the orientation A of the semi-finished product H is detected relative to a reference point X fixed at the recording area 18. Corresponding signals can also be transmitted to the controlling or regulating unit 8. Depending on these signals, the semi-finished product H can then be positioned on the target position $P_{SOLL}$ accordingly.

On the basis of FIG. 10, finally, the molding process and the molding installation 4 is still schematically illustrated. This molding installation 4 (also referred to a molding plant) comprises the molding machine 1 and at least the device 7 for arranging semi-finished products H for a molding process. The molding machine 1 comprises the injection unit 19 for injecting the liquid molding material K and the closing unit 20. The molding tool 5 is mounted to mold mounting plates of the closing unit 20. The molding mounting plates can be moved relative to each other by the drive device 21. In the closed state, the cavity C is formed between the mold halves of the molding tool 5. The placing device is formed by the placing table 6 together with the handling device 3. The placing table 6 comprises a plate which forms the placing surface. A plurality of semi-finished products H is placed on the placing table 6 (or optionally onto a placing surface directly formed in the molding tool 5) by the handling device 3. The semi-finished products H are positioned on a target position $P_{SOLL}$. Preferably, the target position $P_{SOLL}$ is saved or is determined by the installation control unit 10. The semi-finished products H can be held, preferably over the entire surface, on a plate of the placing table 6 by a vacuum generating device (not shown). The semi-finished products H are then—for example as a semi-finished product cluster (if the individual semi-finished products H are already connected to each other e. g. by bonding or welding) or together with the placing table 6 formed as a sliding table—moved into the molding tool 5, whereby the semi-finished products H are located in the cavity C. Subsequently to the closing of the molding tool 5, liquid molding material K (in particular plastic melt) is introduced into the cavity C. The consolidation of the molding material K together with the semi-finished product H to form the molding part F is carried out by a corresponding pressure application by means of the closing unit 20. The hardening can still be accelerated by a cooling. After opening the molding tool 5, the molding part F can be removed by the handling device 3 (or by an ejection device). In this schematical example according to FIG. 10, the controlling or regulating unit 8 is an integral component of the installation control unit 10. All substantial components of the molding installation 4 are centrally controlled or regulated with this installation control unit 10.

Especially the step of the detection of the (partial) outline U of the semi-finished product H is shown with reference to FIG. 11.

FIG. 11 shows a semi-finished product store 15. A plurality of (already cut) semi-finished products H is stored in the semi-finished product store 15. Basically, it is possible that the handling device 3 of the placing devices picks up each semi-finished product H directly from the semi-finished product store 15. For a faster process, however, it is provided that this semi-finished product store 15 comprises a separating device 23 with which individual semi-finished products H can be retrieved from the magazine compartment and can be made available for the picking up on the picking surface of the picking table 22.

Subsequently, the semi-finished product H made available on the picking table 22 is picked up by the transfer head 13 of the handling device 3 and is transported to the detection device 2. At this point, the semi-finished product H is only broadly centered so that the picking-up position of the semi-finished product H (tape) on the transfer head 13 can slightly vary.

The detection device 2 comprises the detection surface E. In this case, the detection surface E is formed on a transparent plate 24. A recording device 17 (not shown here) is arranged below the transparent plate 24. The recording device 17 is formed as a camera of an optical measuring system which is directed towards the transparent plate 24. The detection surface E of the transparent plate 24 together with the camera forms the so-called camera table.

As the semi-finished product H is held only punctually by means of a vacuum on the transfer head 13, it cannot be guaranteed that the true dimensions of the semi-finished product H on the transfer head 13 can be measured. In order to bring the semi-finished product H into a stretched position, the transfer head 13 is pressed against the detection surface E. Thus, the semi-finished product H is automatically brought into a stretched position. As the detection surface E is stationary, subsequently also the distance between the semi-finished product H and the optical measuring system is defined and is predetermined. Thereby, a simple and constant detection can be carried out, especially as most optical measuring systems work with a fix focal length.

As soon as the semi-finished product H has reached the stretched position, the optical measuring system of the detection device 2 captures an image of the semi-finished product H together with the transfer head 13 through the transparent plate 24. In order to determine the exact location of the semi-finished product H at the transfer head 13, a reference point or mark X is located at the transfer head 13. The location and the size of this at least one reference mark X are known. Thus, it is possible to detect the exact location and/or orientation of the semi-finished product H in relation to the reference mark X. Especially, however, at least one part of an outline U of a semi-finished product H arranged on the detection surface E is detected by the detection device 2. This (partial) outline U is saved in a memory (or in the cloud) as after the placing this (partial) outline U forms a placing edge for a further semi-finished product H to be placed adjacent.

After the exact position of the semi-finished product H at the transfer head 13 of the handling device 3 is known, the transfer head 13 can be moved further to the placing surface L. This placing surface L is formed on a placing table 6. As a target position $P_{SOLL}$ for the semi-finished product H and/or for the placing device is determined by the controlling or regulating unit 8 by matching the at least one part of the outline U with a placing edge occurring on an underlying surface, the semi-finished product H can be placed by the placing device on the placing surface L using the target position $P_{SOLL}$. The calculation of the exact position does not have to be carried out on the camera table, rather this calculation can also be carried out during the robot movement between the camera table and the placing table 6.

As soon as the transfer head 13 has reached the placing table 6, the semi-finished product H is taken over by the placing table 6. If the just placed semi-finished product H is the first layer which is placed, this semi-finished product H is fixed to the placing table 6 (preferably by means of a vacuum). At least one part of the saved outline U of the just placed semi-finished product H is then forming the placing edge occurring on the underlying surface (placing surface L) for a further semi-finished product H to be placed.

After the semi-finished product H is placed, the process again starts from the beginning and the transfer head 13 picks up the next semi-finished product H from the semi-finished product store 15 until the build-up of the whole semi-finished product lay-up is finished. The next placed semi-finished products H are then, preferably cohesively, connected to the adjacent located and/or below located semi-finished products, for example by several welding points.

FIG. 11 shows particularly well that the detection surface E of the detection device 2 is formed separate from the placing surface L of the placing device and is arranged distanced to the placing surface L. As a consequence, the outline detection and the placing can be decoupled or separated from each other. Thus, a particularly fast production of a semi-finished product lay-up is possible, especially as the two handling devices 3 can work offset from one another at the production of a semi-finished product lay-up. This means, while one handling device 3 is moving the semi-finished product H from the detection surface E to the placing surface L, the other handling device 3 can already move a semi-finished product H from the picking table 22 to the detection surface E.

LIST OF REFERENCE SIGNS

1 molding machine
2 detection device
3 handling device
4 molding installation
5 molding tool
6 placing table
7 device for arranging semi-finished products
8 controlling or regulating unit
9 memory
10 installation control unit
11 socket
12 handling arm
13 transfer head
14 holding elements
15 semi-finished product store
16 illumination device
17 recording device
18 recording area
19 injection unit
20 closing unit
21 drive device
22 picking table
23 separating device
24 transparent plate
H semi-finished product
U outline
R outline reference range
O1 upper side
O2 bottom side
S1-S4 lateral edges
B detection viewing direction
X reference mark
P position
A orientation
V reinforcement fibers
F molding part
C cavity
K liquid molding material
$P_{SOLL}$ target position
EX sorting-out area
OK making-available area
$S_{EX}$ signal for sorting out the semi-finished product
$S_{OK}$ signal for making available the semi-finished product
$V_L$ longitudinal fibers
$V_Q$ transverse fibers
E detection surface
L placing surface

The invention claimed is:

1. A method of arranging semi-finished products by using an electronically controlled or regulated placing device for the semi-finished products, the method comprising:
    detecting at least one part of an outline of a semi-finished product to be placed, wherein the detecting is carried out by a detection device;
    determining a target position for the semi-finished product or for the placing device for placing the semi-finished product by matching the at least one part of the outline with a placing edge occurring on an underlying surface; and
    placing the semi-finished product by the placing device using the target position,
    wherein the semi-finished product comprises reinforcement fibers,
    wherein a running direction of the reinforcement fibers is detected by the detection device, and the semi-finished product is sorted out when the detection device detects that gaps between the reinforcement fibers are larger than a predetermined threshold.

2. The method according to claim 1, wherein the semi-finished product is a flat semi-finished product with an upper side, a bottom side and lateral edges.

3. The method according to claim 2, wherein the detecting of the at least one part of the outline of the semi-finished product is carried out from a detection viewing direction which is oriented substantially perpendicular to the upper side or to the bottom side.

4. The method according to claim 1, wherein the target position for the semi-finished product or for the placing device for placing the semi-finished product is determined in such a way that, when placing the semi-finished product gaps are prevented from being formed between the semi-finished product and an already previously placed semi-finished product or an overlapping is prevented between the semi-finished product and an already previously placed semi-finished product.

5. The method according to claim 1, wherein prior to the detecting of the at least one part of the outline, the semi-finished product is picked up by the placing device.

6. The method according to claim 1, wherein the semi-finished product is held by the placing device when detecting the at least one part of the outline of the semi-finished product.

7. The method according to claim 1, wherein a comparison of the detected outline with a saved outline reference range or a comparison of a measurement of the semi-finished product determined from the detected outline with a saved reference measurement range is carried out, and wherein depending on a result of the comparison, either
   a sorting out of the semi-finished product is carried out when the detected outline of the semi-finished product lies at least in sections beyond the outline reference range or the determined measurement of the semi-finished product lies beyond the reference measurement range, or
   the semi-finished product is made available for use in a molding process when the detected outline of the semi-finished product lies within the outline reference range or the determined measurement of the semi-finished product lies within the reference measurement range.

8. The method according to claim 1, wherein the at least one part of the outline is detected relative to at least one reference mark.

9. The method according to claim 1, wherein the placing device comprises a handling device.

10. The method according to claim 1, wherein a position or an orientation of the semi-finished product is determined from the detected outline.

11. The method according to claim 10, wherein the target position for the semi-finished product or for the placing device is determined from the determined position or the determined orientation of the semi-finished product.

12. The method according to claim 1, wherein the placing device comprises a placing surface for the semi-finished product, and wherein the placing surface forms the underlying surface for placing the semi-finished product.

13. A molding process for the production of a molding part in a molding installation, wherein the molding installation comprises a molding machine and a placing device, the process comprising:
   carrying out the method according to claim 1;
   inserting at least one semi-finished product, which has been made available for use, into a molding tool of the molding machine;
   closing the molding tool, whereby the at least one semi-finished product is at least partially situated in a cavity of the molding tool;
   introducing a liquid molding material into the cavity;
   at least partially hardening the introduced liquid molding material together with the at least one semi-finished product to form the molding part;
   opening the molding tool; and
   removing the molding part from the molding tool.

14. A method of arranging semi-finished products by using an electronically controlled or regulated placing device for the semi-finished products, the method comprising:
   detecting at least one part of an outline of a semi-finished product to be placed, wherein the detecting is carried out by a detection device;
   determining a target position for the semi-finished product or for the placing device for placing the semi-finished product by matching the at least one part of the outline with a placing edge occurring on an underlying surface; and
   placing the semi-finished product by the placing device using the target position,
   wherein the detection device comprises an optical measuring system and an illumination device, and a spectral distribution of emitted electromagnetic radiation is adapted to an absorption spectrum of the semi-finished product in such a way that a contrast ratio of images captured by the optical measuring system is optimized.

15. A method of arranging semi-finished products by using an electronically controlled or regulated placing device for the semi-finished products, the method comprising:
   detecting at least one part of an outline of a semi-finished product to be placed, wherein the detecting is carried out by a detection device;
   determining a target position for the semi-finished product or for the placing device for placing the semi-finished product by matching the at least one part of the outline with a placing edge occurring on an underlying surface; and
   placing the semi-finished product by the placing device using the target position, wherein during the detection of the at least one part of the outline, the semi-finished product is pressed against a transparent detection surface.

16. The method according to claim 15, wherein the detection surface is formed separate from a placing surface of the placing device and is arranged at a distance from the placing surface.

17. A device for arranging semi-finished products, comprising:
   a placing device for the semi-finished products;
   a detection device configured to detect at least one part of an outline of a semi-finished product to be placed; and
   an electronic controlling or regulating unit configured to control or regulate the placing device, wherein the controlling or regulating unit is further configured to determine a target position for the semi-finished product or for the placing device by matching the at least one part of the outline with a placing edge occurring on an underlying surface, and to use the target position when controlling or regulating the placing device for placing the semi-finished product,
   wherein the semi-finished product comprises reinforcement fibers,
   wherein the detection device is configured to detect a running direction of the reinforcement fibers and gaps between the reinforcement fibers, and the controlling or regulating unit is configured to output a signal to the placing device to sort out the semi-finished product when the detection device detects that the gaps between the reinforcement fibers are larger than a predetermined threshold.

18. The device according to claim 17, wherein the matching is carried out by minimizing the gaps between the semi-finished products or a defining an extent of a gap between the semi-finished products or an extent of an overlap between the semi-finished products.

19. The device according to claim 17, wherein the placing device comprises a handling device for handling the semi-finished product.

20. The device according to claim 17, wherein a reference mark is provided on the placing device, and wherein the at least one part of the outline, a position or an orientation of the semi-finished product is detected or is determined relative to the reference mark.

21. The device according to claim 17, wherein the controlling or regulating unit is configured to carry out a comparison of the detected outline with a saved outline reference range or a comparison of a measurement of the semi-finished product determined from the detected outline with a saved reference measurement range, and, depending on a result of the comparison, either to move the semi-finished product by the placing device into a sorting-out area when the detected outline of the semi-finished product lies at least in sections beyond the outline reference range or the determined measurement of the semi-finished product lies beyond the reference measurement range, or to move the semi-finished product by the placing device into a making-available area when the detected outline of the semi-finished product lies within the outline reference range or the determined measurement of the semi-finished product lies within the reference measurement range.

22. The device according to claim 21, wherein the controlling or regulating unit is configured to carry out the comparison of the detected outline with the saved outline reference range, and wherein the outline reference range is saved in a memory of the controlling or regulating unit.

23. A molding installation for producing a molding part, comprising a molding machine and the device according to claim 17.

24. The molding installation according to claim 23, comprising an installation control unit, wherein the controlling or regulating unit of the device for arranging semi-finished products is connected by signaling technique with the installation control unit or is integrated into the installation control unit.

* * * * *